United States Patent [19]

Schmitt et al.

[11] Patent Number: 5,366,282
[45] Date of Patent: Nov. 22, 1994

[54] DRIVE SLIP REGULATING SYSTEM

[75] Inventors: Johannes Schmitt, Markgroeningen; Peter Rupp, Steinheim/Murr, both of Germany

[73] Assignee: Robert Bosch GmbH, Stuttgart, Germany

[21] Appl. No.: 932,337

[22] Filed: Aug. 19, 1992

[30] Foreign Application Priority Data

Sep. 30, 1991 [DE] Germany ............... 4132490

[51] Int. Cl.$^5$ .................................. B60T 8/70
[52] U.S. Cl. .................. 303/110; 303/113.2; 180/197
[58] Field of Search .............. 180/197; 303/103, 110, 303/113.2, 113.3, 99, 105, 108, 110; 364/426.03

[56] References Cited

U.S. PATENT DOCUMENTS

| | | | |
|---|---|---|---|
| 3,776,355 | 12/1973 | Scherenberg | 180/197 X |
| 4,419,654 | 12/1983 | Funk | 180/197 X |
| 4,615,410 | 10/1986 | Hosaka | 188/197 |
| 4,765,430 | 8/1988 | Schulze et al. | 180/197 |
| 4,785,904 | 11/1988 | Leiber et al. | 180/197 |
| 4,825,371 | 4/1989 | Hoashi et al. | 364/426.02 |
| 4,856,610 | 8/1989 | Leiber et al. | 180/197 |
| 4,917,208 | 4/1990 | Komoda | 180/197 |
| 4,921,064 | 5/1990 | Wazaki et al. | 180/197 |
| 4,970,649 | 11/1990 | Matsuda | 364/426.02 |
| 4,975,851 | 12/1990 | Ishikawa | 303/95 X |
| 5,047,940 | 9/1991 | Onaka et al. | 364/426.03 X |
| 5,103,398 | 4/1992 | Akiyama | 364/424.1 |
| 5,103,399 | 4/1992 | Iwata et al. | 364/426.03 |

FOREIGN PATENT DOCUMENTS 2257658 3/1974 Germany.
3844121 6/1989 Germany.

*Primary Examiner*—Matthew C. Graham
*Assistant Examiner*—Alfred Muratori
*Attorney, Agent, or Firm*—Felfe & Lynch

[57] ABSTRACT

Engine speed is measured at successive moments and the gradient $DN_{mot}$ of the engine speed is determined based on successively measured engine speeds. Speeds of the driven wheels are measured and used to generate wheel speed signals, which in turn are used to control slippage of the driven wheels. The wheel speed signals are subject to a rise limitation dependent on the gradient $DN_{mot}$ of the engine speed. In a preferred embodiment the rise limitation is active when the vehicle is in first gear, the gradient $DN_{mot}$ is positive, VABS (n) is greater than or equal to $VASR(n-1)$, and VABS(n) is greater than or equal to $VASR(n-1)+DN_{mot}/K$, where VABS(n) is a wheel speed signal generated by the ABS at moment n and $VASR(n-1)$ is the wheel speed signal generated by the ASR in the previous moment.

7 Claims, 2 Drawing Sheets

DRIVE SLIP REGULATING SYSTEM

BACKGROUND OF THE INVENTION

The invention relates to a system for limiting the slippage of a driven wheel using the engine speed gradient as a control variable.

On the basis of irregularities, brake squealing, pulsating wheel flutter due to excessive differential response, and drive train vibrations, plausible but untrue speeds are sensed in drive slip regulating systems, which do not correspond to the actual speed of the driven wheels of a motor vehicle. Averaging wheel speeds over several calculation cycles and/or a constant rise limitation are the methods that have been used heretofore to eliminate these erroneous influences.

SUMMARY OF THE INVENTION

A speed difference calculated from the engine speed gradient serves in the invention as a variable and plausible rise limitation for a conventionally computed speed of a driven wheel, as obtained in the case of ABS and ASR.

The rise limitation can be further varied in accordance with
a) the engaged gear or the selected gear in automatic transmissions;
b) the driven wheel that rotates faster. A lesser limiting, which can be calculated, is associated with this wheel than with the other driven wheel;
c) a clutch signal which is proportional to the clutch travel;
d) the clutch switch.

The invention prevents any unnecessary ASR, increasing the ease of regulating and the traction of the vehicle.

The recognition of a μ-split roadway and therefore the switchover to "select high" mode of regulating is improved.

DESCRIPTION OF THE FIGURES

Figure 1:
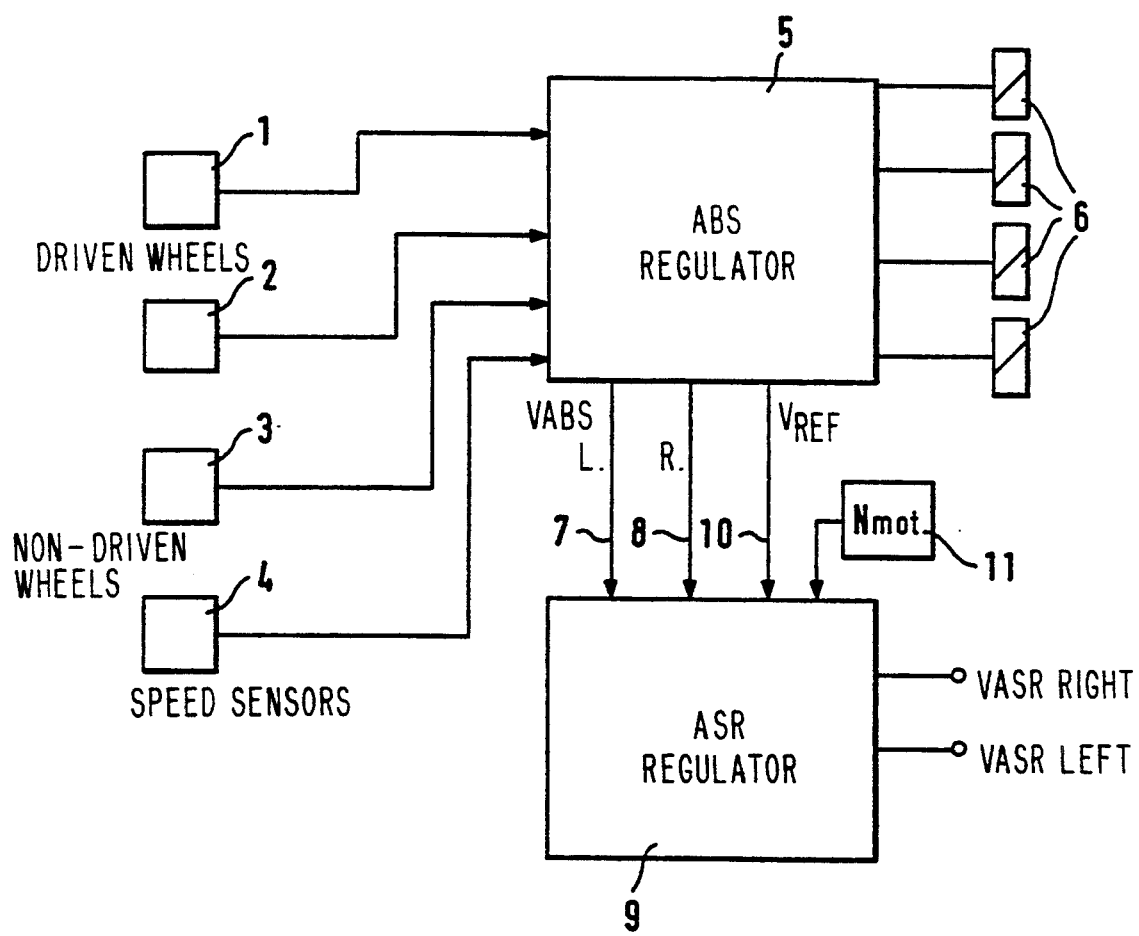
FIG. 1 is a block diagram of a combined ABS/ASR system.

In FIG. 1 is shown a block circuit diagram of an embodiment of a combined ABS/ASR system. Four speed sensors 1–4 associated with the four wheels of a motor vehicle feed signals to an ABS regulator 5 which from these signals produces brake pressure regulating signals for the solenoid valves 6. For the determination of the brake slip, the regulator 5 produces filtered wheel speed signals which have a constant rise limit, i.e., a maximum gradient of the wheel speed rise, which can be 50 g, for example. A method and apparatus for limiting the rise of the wheel speeds is described in U.S. Pat. No. 4,787,682, which is incorporated herein by reference. The filtered wheel speeds VABS left and VABS right of the driven wheels are also given to the regulator 9 for an ASR through leads 7 and 8. Furthermore, the regulator 5 obtains a reference speed signal $V_{REF}$ from the wheel speed signals of the undriven wheels, which is fed through a line 10 to the regulator 9 as vehicle speed for the formation of the slip in the case of ASR. These speed signals are always present in a running vehicle. An engine speed meter 11 supplies the engine speed $N_{mot}$.

Figure 2:
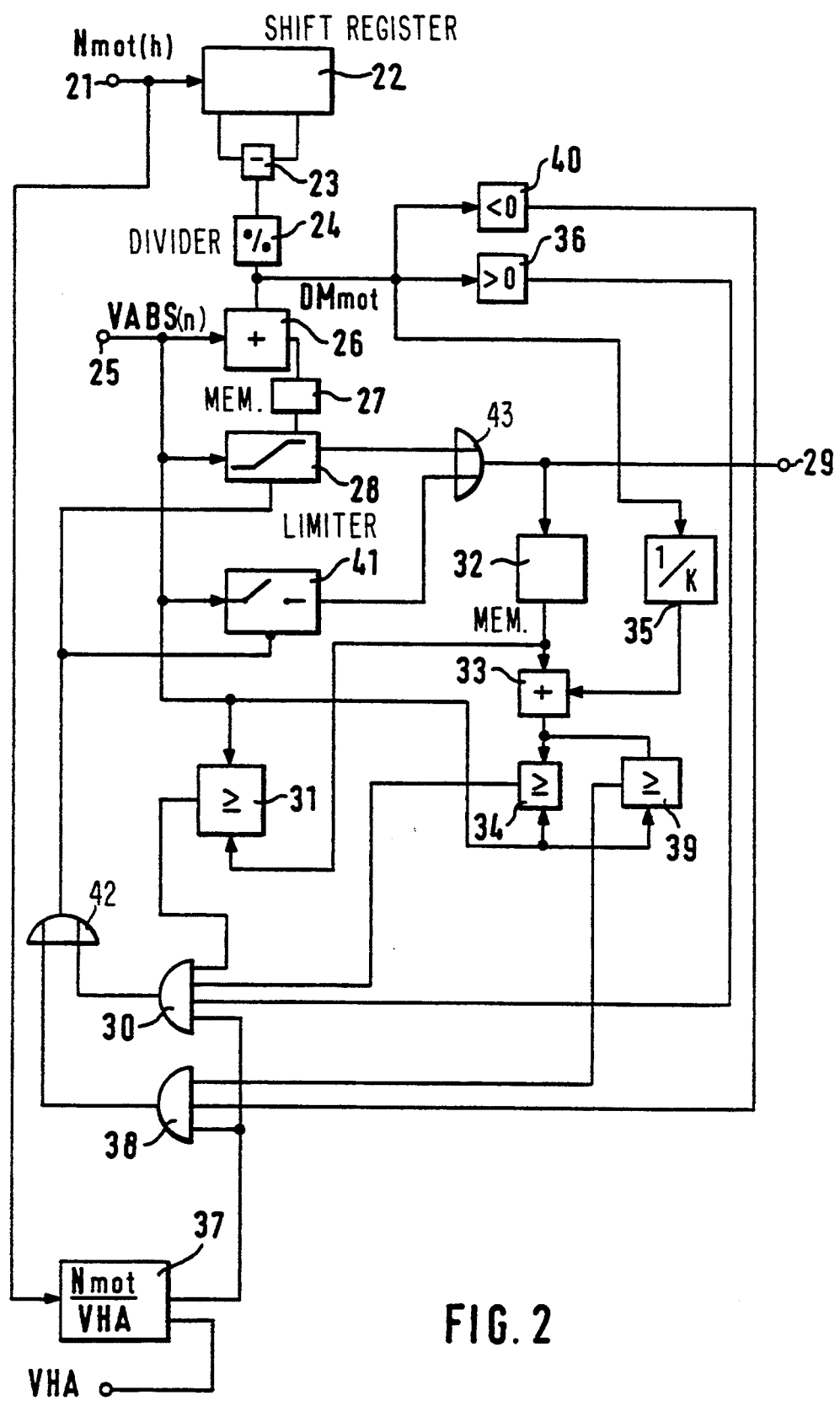
FIG. 2 is a block diagram of part of the regulator.

Part of the regulator 9 is represented in FIG. 2 in the form of a block diagram; here only the arrangement for forming a single VASR signal is represented.

The engine speed $N_{mot}$ is fed to a terminal 21 and is delivered to a shift register 22 with, for example, 8 places. In this case the eight last-measured $N_{mot}$ values are stored. A subtract circuit 23 forms $$N_{mot}(n) - N_{mot}(n-8).$$

This value is divided by 8 in a divider 24. The result is the gradient of the engine speed curve:

$$DN_{mot} = \frac{N_{mot}(n) - N_{mot}(n-8)}{8}$$

The VABS(n) supplied by terminal 25 (corresponds, for example, to line 7) is fed to divider/adder 26 where the signal $DN_{mot}/K$ is added. K is a constant, 60 for example, dimensioned so that the value of $DN_{mot}/K$ is in km/h.

The result of the addition is the amount which the wheel speed VABS must not exceed in the next measurement. This limit value is temporarily held in a memory 27 and is available in the next measurement as the limit value for a limiter 28. This means that, assuming that the limiter 28 is active, VABS(n) passes the limiter 28 unaffected as long as the new value of VABS(n) is less than $VASR(n-1)+DN_{mot}/K$, but when it is greater it is limited to the limit value. The output signal from the limiter 28 forms the applicable VASR value if the limiter is active, and is available at terminal 29 for processing. The limiter 28 is active whenever any of the following conditions are fulfilled:

1) VABS(n)≧VASR(n−1) ∧ $DN_{mot}$>0 ∧ VABS(n)≧(VASR(n−1)+$DN_{mot}$/K and in addition the first gear is engaged.

2) ($DN_{mot}$<0) ∧ VASR(n−1)+$DN_{mot}$/K and the first gear is engaged.

The first condition is fulfilled by an AND gate 30. This gate emits a signal whenever a) a comparator 31 puts out a signal VABS(n) greater than (or equal to) the magnitude VASR(n−1) held in a temporary memory 32; b) VABS(n) is greater than (or equal to) VASR(n−1)+$DN_{mot}$/K from memory 32, adder 33, comparator 34, and divider 35; c) $DN_{mot}$ is greater than 0 (comparator 36); and (d) first gear is engaged (in divider/comparator 37, the $N_{mot}$ is divided by the average rear axle speed $V_{HA}$ and issues a signal when it is greater than a given magnitude, e.g.,75).

The second condition is fulfilled by an AND gate 38. This gate puts out a signal whenever the sum VASR(n−1)+$DN_{mot}$/K at the output of the adder 33 is less than or equal to VABS(n) (comparator 39), and $DN_{mot}$>0 (comparator 40), and likewise first gear is engaged. Allowance is made for clutch slippage or converter slippage, (Automatic Transmission). A signal at one of the AND gates 30 and 38 via OR gate 42, activates the limiter 28 and blocks a block 41. On the other hand, limiter 28 blocks, and block 41 becomes conductive, if neither of the AND gates 30 and 38 delivers an output signal. In this case, VABS(n) forms the ASR wheel speed signal, which, via OR gate 43, then appears at terminal 29.

If the sign of $DN_{mot}$ changes, VASR jumps to VABS, the height of the jump corresponding to the difference that has added up. However, it must jump only when:
$VASR < N_{mot}/K$ and jumps to: $VASR(n) = N_{mot}/K$ (this applies to + after −) and
$VASR < N_{mot}/K$ and jumps to: $VASR(n) = N_{mot}/K$ (this applies to − after +)

The $DN_{mot}$ query preferably has a hysteresis.

We claim:

1. A system for regulating wheel slippage of a motor vehicle having two driven wheels, said system comprising means for measuring speeds of the driven wheels, means for measuring engine speed $N_{mot}(n)$ at moments $(n-1), n, \ldots,$ means for determining the gradient $DN_{mot}$ of the engine speed based on successively measured engine speeds, means for determining when the vehicle is in first gear, an ABS which generates wheel speed signals $VABS(n-1)$ and $VABS(n)$ at moments $(n-1)$ and $n$ from the measured wheels speeds, an ASR which generates wheel speed signals $VASR(n-1)$ and $VASR(n)$ for said driven wheels from said wheel speed signals $VABS(n-1)$ and $VABS(n)$, said wheel speed signals $VASR(n)$ being generated by subjecting said wheel speed signals $VABS(n)$ to a rise limitation dependent upon the gradient $DN_{mot}$ of the engine speed when the vehicle is in first gear, the gradient $DN_{mot}$ is positive, and $VABS(n)$ is greater than or equal to $VASR(n-1) + DN_{mot}/K$, where K is a constant, and means for controlling slippage of said driven wheels using said signals $VASR(n)$.

2. A system as in claim 1 wherein said rise limitation is partially constant.

3. A system according to claim 2 wherein $VASR(n) = VABS(n)$ when the rise limitation is constant.

4. A system according to claim 1, further comprising means for activating the rise limitation for the wheel speed signals $VASR(n)$ when the vehicle is in first gear, the gradient of the engine speed is negative, and $VABS(n) < VASR(n-1) + DN_{mot}/K$.

5. A system according to claim 1 wherein the rise limitation is dependent upon the gear the vehicle is in.

6. A system according to claim 5 wherein allowance is made for clutch slippage.

7. A system according to claim 5 wherein, in the case of an automatic transmission, allowance is made for converter slippage.

* * * * *